3,268,539
TERTIARY-AMINOALKYL DERIVATIVES OF DIARYL SUBSTITUTED ACETOHYDROXAMIC ACID ESTERS
Joseph Levy, Paramus, N.J., assignor to Universal Oil Products Company, Des Plaines, Ill., a corporation of Delaware
No Drawing. Filed May 20, 1963, Ser. No. 281,771
6 Claims. (Cl. 260—294)

This invention relates to novel compositions of matter comprising tertiary-aminoalkyl derivatives of diaryl substituted acetohydroxamic acid esters and to methods for the preparation thereof. More particularly this invention is concerned with tertiary-aminoalkyl derivatives of diphenylacetohydroxamic acid esters and substitution products thereof.

It has now been discovered that novel compositions of matter such as tertiary-aminoalkyl derivatives of diaryl substituted acetohydroxamic acid esters, the ester portion of the compound being a lower alkyl group may be prepared in a manner hereinafter set forth in greater detail, said compounds finding a particular use in the medical field, particularly as anti-spasmodic and anti-cholinergic drugs.

It is therefore an object of this invention to prepare tertiary-aminoalkyl derivative of a diaryl substituted acetohydroxamic acid esters which may be utilized as therapeutic agents.

A further object of this invention is to prepare tertiary-aminoalkyl derivatives of diphenylacetohydroxamic acid lower alkyl esters.

Taken in its broadest aspect one embodiment of this invention is found in a process for the preparation of a tertiary-aminoalkyl derivative of a diaryl substituted acetohydroxamic acid ester which comprises reacting an alkyl ester of a diaryl substituted acetohydroxamic acid with a tertiary-aminoalkyl halide in the presence of an alkaline agent, and recovering the desired tertiary-aminoalkyl derivative of the diaryl substituted acetohydroxamic acid ester.

A further embodiment of this invention is found in a process for the preparation of a tertiary-aminoalkyl derivative of a diphenyl substituted α-hydroxyacetohydroxamic acid ester which comprises reacting a lower alkyl ester of a diphenyl substituted α-hydroxyacetohydroxamic acid with a tertiary-aminoalkyl halide in the presence of an alkaline agent at a temperature in the range of from about 25° to about 100° C., and recovering the desired tertiary-aminoalkyl derivative of the diphenyl substituted α-hydroxyacetohydroxamic acid ester.

Yet another embodiment of this invention is found in a tertiary-aminoalkyl derivative of a diaryl substituted acetohydroxamic acid ester prepared by reacting an alkyl ester of a diaryl substituted acetohydroxamic acid with a tertiary-aminoalkyl halide in the presence of an alkaline agent at reaction conditions.

A specific embodiment of this invention resides in a process for the preparation of a tertiary-aminoalkyl derivative of a diaryl substituted acetohydroxamic acid ester which comprises reacting methyl diphenylacetohydroxamate with 2-chloro-N,N-diethylethylamine in the presence of an alkaline agent at a temperature in the range of from about 25° to about 100° C., and recovering the desired diethylaminoethyl derivative of methyl diphenylacetohydroxamate.

Another specific embodiment of this invention is found in a tertiary-aminoalkyl derivative of a diaryl substituted acetohydroxamic acid ester prepared by reacting the sodium salt of methyl diphenylacetohydroxamate with 2-chloro-N,N-diethylethylamine.

Other objects and embodiments referring to alternative tertiary-aminoalkyl halides, diaryl substituted acetohydroxamic acid esters and substitution products thereof will be found in the following further detailed description of this invention.

As hereinbefore set forth, it has now been discovered that the novel compositions of matter of the present invention, namely, tertiary-aminoalkyl derivatives of diaryl substituted acetohydroxamic esters may be prepared by reacting an alkyl ester of a diaryl substituted acetohydroxamic acid with a tertiary-aminoalkyl halide in the presence of an alkaline agent. In order to define the scope of the invention the desired products may be represented as follows:

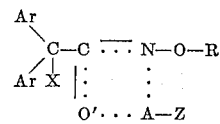

in which Ar is an aromatic radical selected from the group consisting of phenyl, alkylphenyl, halophenyl and alkoxyphenyl radicals, X is selected from the group consisting of hydrogen and hydroxyl radicals, R is selected from the group consisting of alkyl radicals containing from 1 to about 5 carbon atoms, A is selected from the group consisting of straight and branched chain alkylene groups of 2 to 5 carbons and Z is a basic nitrogen containing radical selected from the group consisting of di(loweralkyl)amino, the alkyl portion of the di-(loweralkyl)amino radicals containing from 1 to about 5 carbon atoms, and cyclic amino groups selected from the group consisting of piperidino, pyrrolidino, morpholino, piperidyl, and pyrrolidyl radicals. The dotted lines utilized in the above representation indicate that the alkylene group A may be attached either to the nitrogen or oxygen atoms with a corresponding shift in the double bond, thereby forming isomeric products. Thus, when A is attached to nitrogen, the compound may be more specifically represented by the following formula:

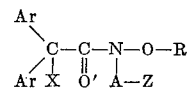

and when A is attached to oxygen by the formula:

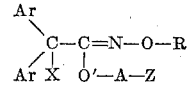

These compounds may be conveniently prepared by reacting a lower alkyl ester of a diaryl substituted acetohydroxamic acid having the generic formula:

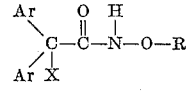

in which the Ar, R and X radicals have the same meaning as hereinbefore set forth with a tertiary-aminoalkyl halide having the generic formula:

Hal—A—Z in which the A and Z radicals have the same meaning as hereinbefore set forth and Hal is a halogen having an atomic weight of from 35 to 80 (i.e., chlorine or bromine) preferably chlorine, since the chlorine-containing compounds are more readily available, in the presence of an alkaline substance.

Examples of lower alkyl esters of diaryl substituted acetohydroxamic acids which may be used in the process of this invention include methyl diphenylacetohydroxamate,
ethyl diphenylacetohydroxamate,
propyl diphenylacetohydroxamate,
butyl diphenylacetohydroxamate,
amyl diphenylacetohydroxamate,
methyl di-(o-tolyl)acetohydroxamate,
ethyl di-(m-tolyl)acetohydroxamate,
propyl di-(p-tolyl)acetohydroxamate,
methyl p-methoxydiphenylacetohydroxamate,
ethyl p-chlorodiphenylacetohydroxamate,
n-butyl p-methyldiphenylacetohydroxamate,
methyl di-(o-methoxyphenyl)acetohydroxamate,
ethyl di-(m-methoxyphenyl)acetohydroxamate,
propyl di-(p-methoxyphenyl)acetohydroxamate,
methyl di-(p-chlorophenyl)acetohydroxamate,
ethyl alpha-hydroxydiphenylacetohydroxamate,
propyl alpha-hydroxy-di-(p-tolyl)acetohydroxamate,
methyl alpha-hydroxy-p-chlorodiphenylaceto-
  hydroxamate,
ethyl alpha-hydroxy-p-methoxydiphenylaceto-
  hydroxamate,
methyl alpha-hydroxy-p-methyldiphenylaceto-
  hydroxamate,
propyl alpha-hydroxy-p-methyldiphenylaceto-
  hydroxamate, etc.

Examples of tertiary-aminoalkyl halides in which the nitrogen may be di-loweralkyl substituted or may form a part of a heterocyclic ring and which fall within the generic formula hereinbefore set forth include 2-chloro-N,N-dimethylethylamine,
2-bromo-N,N-dimethylethylamine,
2-chloro-N,N-diethylethylamine,
2-bromo-N,N-diethylethylamine,
2-chloro-N,N-dipropylethylamine,
2-chloro-N,N-dibutylethylamine,
3-chloro-N,N-dimethylpropylamine,
3-chloro-N,N-diethylpropylamine,
3-chloro-N,N-dipropylpropylamine,
3-chloro-N,N-dibutylpropylamine,
2-chloro-N,N-dimethylisopropylamine,
2-chloro-N,N-diethylisopropylamine,
1-chloro-2-piperidinoethane,
1-chloro-2-(1-N-methylpiperidyl) ethane,
1-chloro-2-pyrrolidinoethane,
1-chloro-2-morpholinoethane,
1-chloro-3-piperidinopropane,
1-chloro-3-pyrrolidinopropane,
1-chloro-3-morpholinopropane, etc.

It is to be understood that the aforementioned compounds are only representatives of the class of compounds which may be used and that the present process is not necessarily limited thereto.

One method of preparing the substituted aminoalkyl derivatives of a diaryl substituted acetohydroxamic acid ester according to the process of this invention involves the reaction of an alkali metal salt of a lower alkyl ester of a diaryl substituted acetohydroxamic acid of the type hereinbefore set forth with a tertiary-aminoalkyl halide also of the type hereinbefore set forth. The alkali metal salts are preferably produced by reacting the hydroxamic acid ester with an alkali metal, metal hydride or amide such as sodium metal, lithium metal, potassium metal, sodium hydride, potassium hydride, lithium hydride, sodamide, potassium amide, lithium amide, etc. The reaction may be effected in the presence of an inert organic solvent such as an aromatic hydrocarbon; i.e., benzene, toluene, o-xylene, m-xylene, p-xylene, ethylbenzene, etc.; a paraffinic hydrocarbon such as pentane, hexane, heptane, cyclopentane, cyclohexane, methylcyclopentane, etc. Other solvents and preferably polar non-protonic solvents such as dimethyl formamide, dimethyl acetamide, dimethoxy ethane, dimethyl sulfoxide, etc. may be used to advantage. It is also feasible under appropriate conditions to prepare the alkali metal salts of the hydroxamate esters by employing alkali metal hydroxides such as sodium hydroxide, potassium hydroxide, lithium hydroxide.

One particular method of preparing the products of the present invention comprises gradually adding the lower alkyl ester of the diaryl substituted acetohydroxamic acid to the alkali metal compound such as sodium hydride, potassium hydride, etc. which has been suspended in the particular organic solvent and after evolution of hydrogen has ceased the tertiary-aminalkyl halide is added. The mixture is then heated to the desired temperature. The reaction may proceed at room temperature, although elevated temperatures up to the reflux temperature of the particular solvent employed may be used to increase the reaction rate and thus complete the reaction. Upon completion of the desired reaction, the alkali metal halide resulting from the reaction is filtered off and the solvent is evaporated or removed by distillation in vacuum following which the product may then be isolated by conventional means taking advantage of the relative acidic and basic properties of the materials present to achieve separation and purification. The product may be converted to a crystalline salt for example by utilizing mineral or organic acids such as hydrochloric acid, sulfuric acid, tartaric acid, citric acid, maleic acid, fumaric acid, oxalic acid, etc. The quaternary salts are also readily produced by reacting the free base with an alkyl halide, an alkyl sulfate, toluene sulfonate, etc., in a suitable solvent according to well known procedures following which the crystalline product is separated and purified by recrystallization from a suitable solvent.

As heretofore described, the reaction products obtained according to this process will comprise N-tertiary-aminoalkyl-O-alkyl diaryl substituted acetohyroxamate compounds if are aforesaid tertiary-aminoalkyl group is attached to the nitrogen atom; or O'-tertiary-aminoalkyl-O-alkyl diaryl substituted acetohydroximate compounds if the tertiary-aminoalkyl group is attached to the oxygen atom as shown in the hereinbefore set forth generic formulae.

A possible alternative method of synthesizing compounds of the present invention comprises reacting a diaryl substituted acetic acid halide possessing the generic formula:

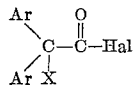

in which Ar, X and Hal has the same meaning as above, except that when X is hydroxy it is protected by, for example, an acetyl group which can be removed subsequently by hydrolysis, with a tertiary-aminoalkylalkoxyamine having the generic formula:

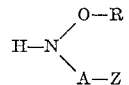

in which A and Z have meanings similar to that hereinbefore set forth according to the following equation:

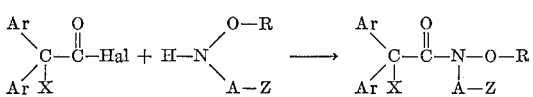

It is to be understood from the above equation that when this method of synthesis is used, only the N-tertiary-aminoalkyl-O-alkyl diaryl substituted acetohydroxamate compounds are formed.

Examples of tertiary-aminoalkyl derivatives of lower alkyl esters of diaryl substituted acetohydroxamic acids which may be prepared according to the process of this invention include the 2-diethylaminoethyl derivative of methyl diphenylacetohydroxamate,
the methobromide quaternarly salt of the 2-diethylaminoethyl derivative of methyl diphenylacetohydroxamate,
the 2-diethylaminoethyl derivative of ethyl diphenylacetohydroxamate,
the 2-diethylaminoethyl derivative of propyl diphenylacetohydroxamate,
the hydrochloric acid salt of the 2-diethylaminoethyl derivative of propyl diphenylacetohydroxamate,
the 2-diethylaminoethyl derivative of methyl α-hydroxydiphenylacetohydroxamate,
the methobromide quaternary salt of the 2-diethylaminoethyl derivative of methyl α-hydroxydiphenylacetohydroxamate,
the 3-dimethylaminopropyl derivative of methyl diphenylacetohydroxamate,
the 3-dimethylaminopropyl derivative of ethyl diphenylacetohydroxamate,
the 3-dimethylaminopropyl derivative of methyl α-hydroxydiphenylacetohydroxamate,
the 2-dimethylaminopropyl derivative of methyl diphenylacetohydroxamate,
the 2-dimethylaminopropyl derivative of methyl α-hydroxydiphenylacetohydroxamate,
the 2-piperidinoethyl derivative of methyl diphenylacetohydroxamate,
the 2-piperidinoethyl derivative of methyl α-hydroxydiphenylacetohydroxamate,
the 2-pyrrolidinoethyl derivative of methyl diphenylacetohydroxamate,
the 2-pyrrolidinoethyl derivative of methyl α-hydroxydiphenylacetohydroxamate,
the 3-pyrrolidinopropyl derivative of methyl diphenylacetohydroxamate,
the 3-pyrrolidinopropyl derivative of methyl α-hydroxydiphenylacetohydroxamate, etc.

As is evident from the above list of compounds the term "teritary-aminoalkyl derivatives of lower alkyl esters of diaryl substituted acetohydroxamate acid esters" as used in the present specification and appended claims will also refer to the acid addition salts and quaternary salts of these compounds. It is to be understood that the aforementioned compounds are only representatives of the class of compounds which may be prepared and that the process of the present invention is not necessarily limited thereto.

The following examples are given to illustrate the process of the present invention which, however, are not intended to limit the generally broad scope of the present invention in strict accordance therewith.

Example I

In this experiment 3.5 grams of a 50% sodium hydride-mineral oil suspension was added to 15 cc. of dimethyl formamide and placed in a flask provided with heating, stirring and reflux means. A solution of 15 grams of methyl diphenylacetohydroxamate in 50 cc. of dimethyl formamide was slowly added at a temperature of about 25° to about 30° C. A vigorous reaction proceeded with the evolution of hydrogen gas. Following this a solution of 10.8 grams of 2-chloro-N,N-diethylethylamine in 60 cc. of toluene was slowly added during a period of about 1 hour while the temperature of the reaction mixture was maintained at about 50° C. Upon completion of the addition of the aminoalkyl halide the reaction mixture was then heated to a temperature of about 90° C. for an additional period of 2 hours. The flask and contents thereof were then allowed to cool to room temperature and the sodium chloride which was formed was filtered off and the solvent evaporated. The residual oil which remained after the evaporation of the solvent was taken up in ether and the solution was extracted with 100 cc. of 1% aqueous sodium hydroxide whereby the unreacted methyl diphenylacetohydroxamate starting material was removed. The ether solution was then washed with water and the ether evaporated to give 15 grams of a viscous oil comprising the 2-diethylaminoethyl derivative of methyl diphenylacetohydroxamate, said product analyzing 99% by non-aqueous titration.

The oxalate salt was prepared by treating the product with oxalic acid and said salt was recrystallized from ethanol. The salt melted at a temperature of about 135°–137° C. In addition, the methyl iodide quaternary salt was also prepared by reacting the free base with methyl iodide in ethanol solution to give the crystalline salt which melts at a temperature of about 155°–157° C.

Example II

In this experiment 2.1 grams of a 50% sodium hydride-mineral oil suspension was added to 15 cc. of dimethyl formamide and 10.3 grams of methyl alpha-hydroxydiphenylacetohydroxamate dissolved in 50 cc. of dimethyl formamide were then slowly added with continuous stirring at a temperature of about 25°–30° C. A reaction occurred with the evolution of hydrogen. When the evolution of hydrogen had ceased, a solution of 6 grams of 2-chloro-N,N-diethylethylamine in 50 cc. of toluene was slowly added during a period of about 1 hour while maintaining the reaction temperature at about 50° C. Upon completion of the addition, the temperature was raised to about 85°–90° C. and maintained thereat for an additional period of 2 hours. Following this the flask and contents thereof were cooled to room temperature, the precipiated sodium chloride which formed during the reaction was filtered and the filtrate distilled in vacuo at about 5 mm. pressure at 60° C. to remove the solvent. The residual oil was taken up with 25 cc. of benzene and the organic solution was extracted with two 25 cc. portions of a 10% aqueous sodium hydroxide to remove the unreacted methyl alpha - hydroxydiphenylacetohydroxamate starting material. The benzene solution was then washed with water and the benzene evaporated to give 9.4 grams of reaction product which solidified upon standing. The product was recrystallized from ethanol to yield crystals melting at 114°–114.5° C. and analyzing 98% by non-aqueous titration as the desired 2-diethylaminoethyl derivative of methyl alpha-hydroxydiphenylacetohydroxamate.

The hydrochloric acid salt of the derivative was prepared by adding anhydrous hydrogen chloride to an ether solution of the product to yield crystals which melted at 180.5° 181.5° C. In addition the methobromide quaternary salt was prepared by dissolving 1 gram of the recrystallized free base in ether and passing methyl bromide gas into the solution. The methobromide salt crystallized out upon standing said salt having a melting point of 203.5°–205° C.

Example III

A mixture of 2.7 grams of a 50% sodium hydride-mineral oil suspension in 15 cc. of dimethyl formamide was treated in a manner similar to that hereinbefore set forth with a solution of 12.1 grams of methyl diphenylacetohydroxamate in 50 cc. of dimethyl formamide, the latter solution being slowly added to the former at a temperature of about 25°–30° C. with continuous stirring. A reaction occurred with an evolution of hydrogen. Upon cessation of the evolution of hydrogen the mixture was heated to a temperature of about 50° C. and a solution of 8 grams of 3-chloro-N,N-dimethylpropylamine in 50 cc. of toluene was gradually added during a period of 1 hour. Upon completion of the addition of the substituted aminoalkyl halide the mixture was heated at a temperature of about 85°–90° C. for an additional period of 6 hours. At the end of this time the flask and contents thereof were cooled to room temperature, the sodium chloride which had precipitated out was filtered out and the toluene solvent removed in vacuo by distillation under reduced pressure of 5 mm. at 60° C. The residual oil which remained was taken up in benzene and extracted with a 5% aqueous sodium hydroxide solution to remove unreacted methyl diphenylacetohydroxamate starting material. The benzene solution was then washed with water and the benzene evaporated to give 15.6 grams of the desired 3-dimethylaminopropyl derivative of methyl diphenylacetohydroxamate, said product analyzing 97% by non-aqueous titration.

The oxalate salt of the product was formed by treating the free base dissolved in isopropanol with oxalic acid and the salt was crystallized from said solution. A methobromide quaternary salt was prepared by adding methyl bromide to an ether solution of the free base.

*Example IV*

In this experiment a mixture of 3.3 grams of a 50% sodium hydride-mineral oil suspension in 15 cc. of dimethyl formamide was also treated in a manner similar to that hereinbefore set forth with a solution of 15 grams of methyl diphenylacetohydroxamate dissolved in 50 cc. of dimethyl formamide. A reaction occurred with the evolution of hydrogen. Upon cessation of the evolution of hydrogen the mixture was heated at 50° C. and 11.3 grams of 1-chloro-2-(2-N-methylpiperidyl)ethane was gradually added. The mixture was then heated at a temperature in the range of from about 90°–100° C. for a period of about 2 hours. After cooling to room temperature the precipitated sodium chloride was removed by filtration and the solvent was evaporated at 70° C. under a pressure of 20 mm. The residual oil was dissolved in 100 cc. of ether and the solution extracted with a 1% sodium hydroxide to remove unreacted methyl diphenylacetohydroxamate. The ether solution was then dried over anhydrous magnesium sulfate. Upon evaporation of the ether 12.5 grams of the desired 2-(2-N-methylpiperidyl)ethyl derivative of methyl diphenylacetohydroxamate analyzing 98.8% by non-aqueous titration was recovered.

*Example V*

In this experiment a solution of methyl diphenylacetohydroxamate dissolved in dimethyl formamide is added to a suspension of sodium hydride in dimethyl formamide. Upon completion of the reaction which is evidenced by the cessation of the evolution of hydrogen, 1-chloro-2-piperidinoethane is slowly added thereto. The reaction mixture is heated to a temperature of about 90° C. for a period of about 2–6 hours. Following this the flask and contents thereof are allowed to cool to room temperature, the sodium chloride which has formed is filtered off and the solvent is evaporated. The residual oil is taken up in ether and extracted with an aqueous sodium hydroxide solution to remove unreacted methyl diphenylacetohydroxamate. The ether solution is then washed with water and the ether is evaporated to yield a desired product comprising the 2-piperidinoethyl derivative of methyl diphenylacetohydroxamate.

The free base may be treated in a manner similar to that hereinbefore set forth to form crystalline salt, an example of such procedure being treatment of said base with oxalic acid to form the oxalate salt thereof. In addition the free base may also be reacted with methyl bromide to form the methobromide quaternary salt thereof.

*Example VI*

In this experiment a solution of methyl alpha-hydroxydiphenylacetohydroxamate dissolved in dimethyl formamide is slowly added to a suspension of sodium hydride in dimethyl formamide. The reaction proceeds with the evolution of hydrogen gas, at the end of which time a solution of 1-chloro-3-pyrrolidinopropane in toluene is slowly added to the reaction mixture at a temperature of about 50° C. The reaction mixture is then heated to a temperature of about 90° C. and maintained thereat for an additional period of from 2–6 hours. At the end of this time the flask and contents thereof are allowed to cool to room temperature, the sodium chloride formed during the reaction is filtered off and the solvent removed by distillation under reduced pressure. The residual oil is taken up in ether and treated with an aqueous sodium hydroxide solution to remove the unreacted methyl alpha-hydroxydiphenylacetohydroxamate. The ether solution is then washed with water and the ether evaporated to yield the desired product comprising the 3-pyrrolidinopropane derivative of methyl alpha-hydroxydiphenylacetohydroxamate.

The free base may be treated in a manner similar to that hereinbefore set forth to form crystalline salts and quaternary salts, the former being formed by the addition of anhydrous hydrogen chloride to form crystalline hydrochloric acid salts of the aforementioned derivative while the latter may be prepared by passing methyl bromide gas into a solution of free base in ether thereby forming the methobromide quaternary salt.

I claim as my invention:

1. A compound having a formula selected from the group consisting of:

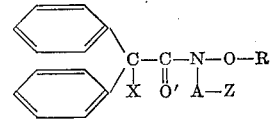

and

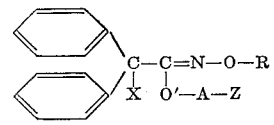

and mineral acid, organic acid and quaternary salts thereof in which X is selected from the group consisting of hydrogen and hydroxyl, R is alkyl of from 1 to about 5 carbon atoms, A is alkylene of from 2 to 5 carbon atoms and Z is a member selected from the group consisting of di-(lower alkyl)amino, piperidino, pyrrolidino, morpholino, piperidyl and pyrrolidyl.

2. A compound selected from the group consisting of:

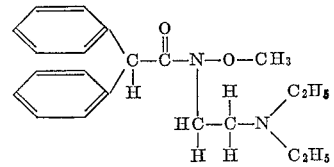

and

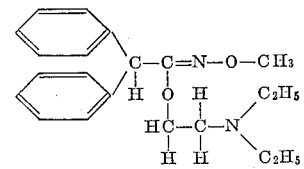

3. A compound selected from the group consisting of:

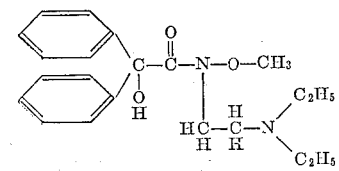

and
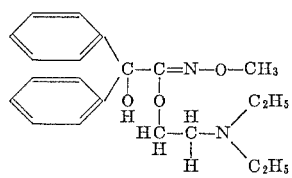
4. A compound selected from the group consisting of:
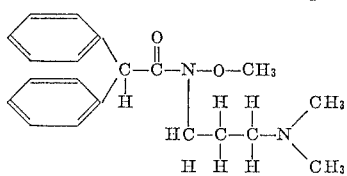
and
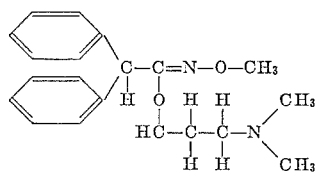
5. A compound selected from the group consisting of:
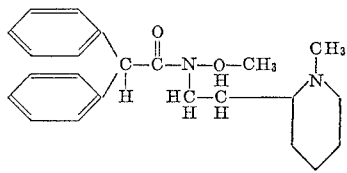
and
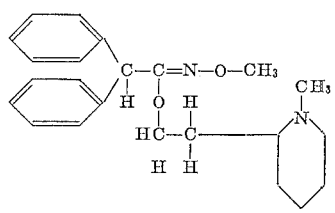
6. A compound selected from the group consisting of:
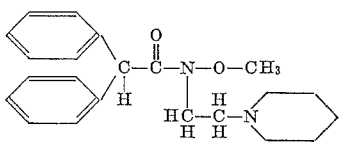
and
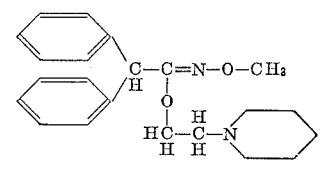
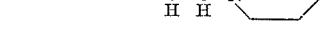
References Cited by the Examiner
Cooley et al.: J. Org. Chemistry, vol. 25, pages 1734–36 (1960).
Jones et al.: J. Am. Chem. Soc., vol. 36, pages 2202–08 (1914).
HENRY R. JILES, *Primary Examiner.*
JOSE TOVAR, *Assistant Examiner.*